(12) United States Patent
Lebby et al.

(10) Patent No.: US 12,535,700 B2
(45) Date of Patent: Jan. 27, 2026

(54) ACTIVE REGION-LESS MODULATOR AND METHOD

(71) Applicant: Lightwave Logic Inc., Longmont, CO (US)

(72) Inventors: Michael Lebby, San Francisco, CA (US); Yasufumi Enami, Tucson, AZ (US); Zhiming Liu, Englewood, CO (US)

(73) Assignee: Lightwave Logic Inc., Longmont, CO (US)

(*) Notice: Subject to any disclaimer, the term of this patent is extended or adjusted under 35 U.S.C. 154(b) by 1706 days.

(21) Appl. No.: 16/680,900

(22) Filed: Nov. 12, 2019

(65) Prior Publication Data

US 2021/0141250 A1 May 13, 2021

(51) Int. Cl.
*G02F 1/225* (2006.01)
*G02F 1/065* (2006.01)
*G02F 1/21* (2006.01)

(52) U.S. Cl.
CPC .............. *G02F 1/065* (2013.01); *G02F 1/225* (2013.01); *G02F 1/212* (2021.01)

(58) Field of Classification Search
CPC ..................................................... G02F 1/225
USPC .............................................................. 385/3
See application file for complete search history.

(56) References Cited

U.S. PATENT DOCUMENTS

| | | | | |
|---|---|---|---|---|
| 5,005,932 | A * | 4/1991 | Schaffner | G02F 1/2255 |
| | | | | 372/12 |
| 5,278,924 | A * | 1/1994 | Schaffner | G02F 1/0356 |
| | | | | 385/9 |
| 6,067,186 | A * | 5/2000 | Dalton | C08K 5/0041 |
| | | | | 252/582 |
| 6,652,779 | B1 * | 11/2003 | Zhang | C09B 23/0091 |
| | | | | 252/582 |
| 8,390,922 | B1 * | 3/2013 | Baehr-Jones | G02F 1/3534 |
| | | | | 359/332 |
| 9,664,931 | B1 * | 5/2017 | Yap | G02F 1/225 |
| 2002/0027220 | A1 * | 3/2002 | Wang | G02F 1/3611 |
| | | | | 252/582 |
| 2002/0084446 | A1 * | 7/2002 | Dalton | C07D 409/06 |
| | | | | 252/582 |
| 2003/0095737 | A1 * | 5/2003 | Welch | G02B 6/136 |
| | | | | 385/14 |

(Continued)

*Primary Examiner* — Kaveh C Kianni
(74) *Attorney, Agent, or Firm* — PARSONS & GOLTRY; Robert A. Parsons; Michael W. Goltry

(57) ABSTRACT

A polymer modulator includes a first cladding layer, a passive core region with a surface abutting a surface of the first cladding layer, the passive core region extending to define an optical input and an optical output for the modulator, a shaped electro-optic polymer active component with a surface abutting a surface of a central portion of the passive core region, the shaped electro-optic polymer active component being polled to align dipoles and promote modulation of light, the shaped electro-optic polymer active component having a length that extends only within a modulation area defined by modulation electrodes, and a second cladding layer enclosing the shaped electro-optic polymer active component and designed to produce adiabatic transition of light waves traveling in the passive core region into the shaped electro-optic polymer active component to travel the length of the shaped electro-optic polymer active component and return to the passive core region.

8 Claims, 22 Drawing Sheets

(56) References Cited

U.S. PATENT DOCUMENTS

| | | | |
|---|---|---|---|
| 2007/0035800 A1* | 2/2007 | Hochberg | G02F 1/3517 |
| | | | 359/237 |
| 2010/0014800 A1* | 1/2010 | Derose | G02F 1/065 |
| | | | 385/2 |
| 2010/0015741 A1* | 1/2010 | Krug | G02F 1/3132 |
| | | | 438/31 |
| 2016/0313579 A1* | 10/2016 | Yokoyama | G02B 6/125 |

\* cited by examiner

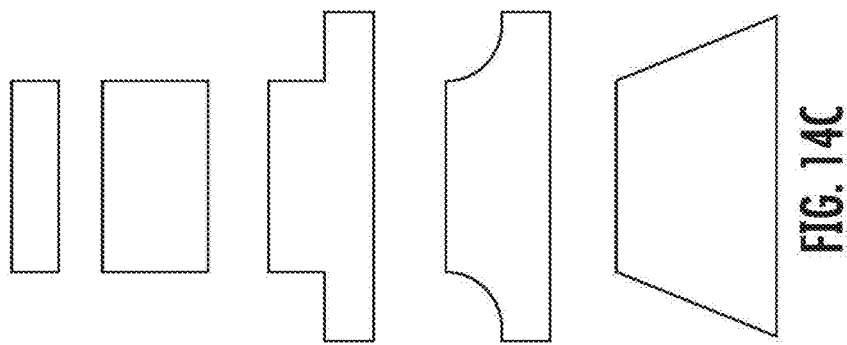
FIG. 14C
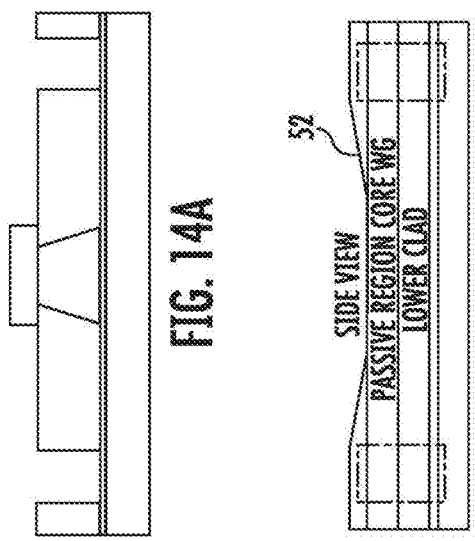
FIG. 14A
SIDE VIEW
PASSIVE REGION CORE WG
LOWER CLAD
FIG. 14B

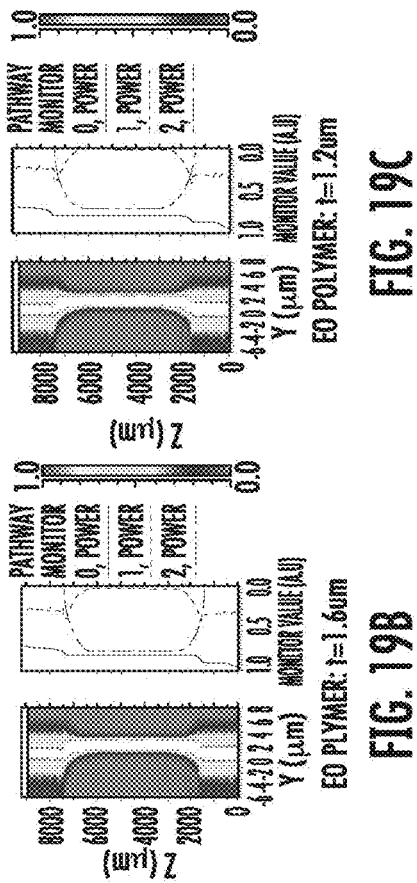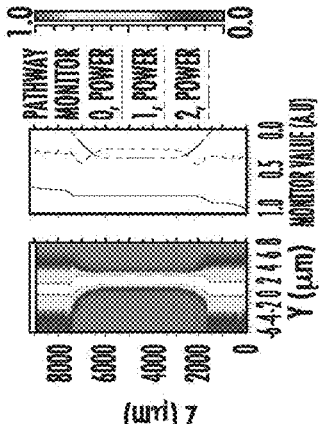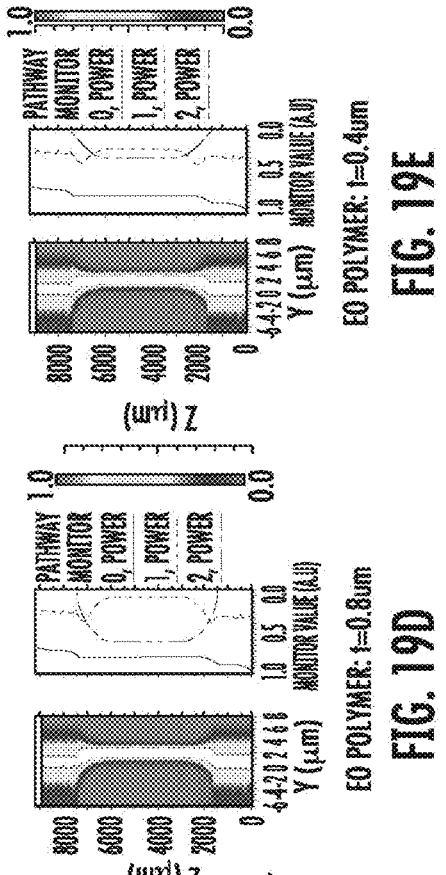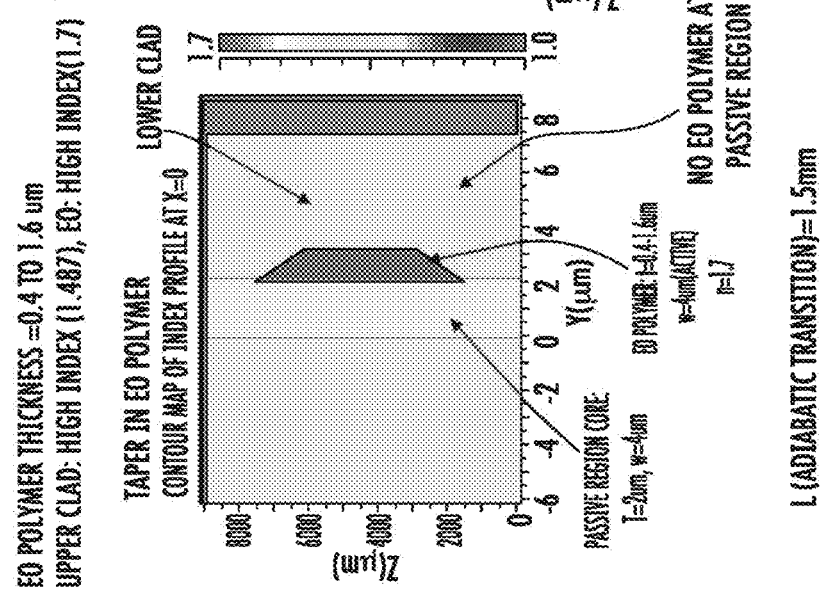

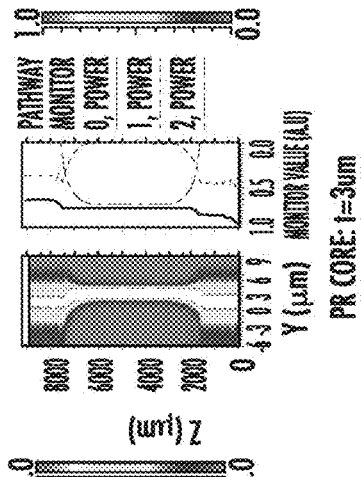
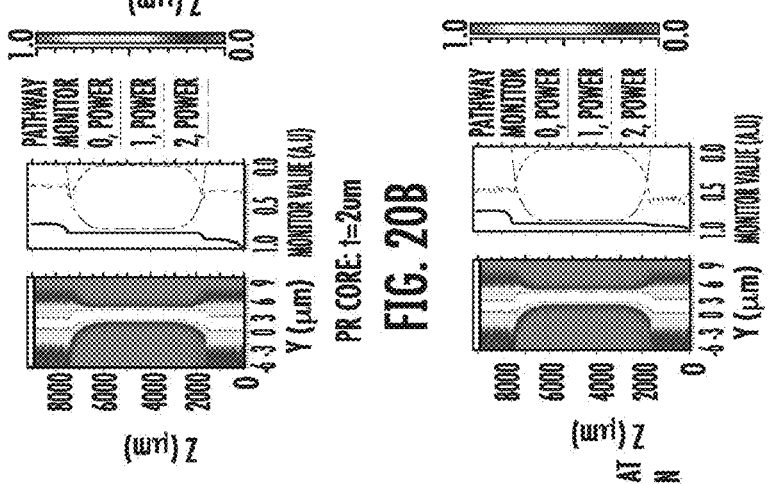
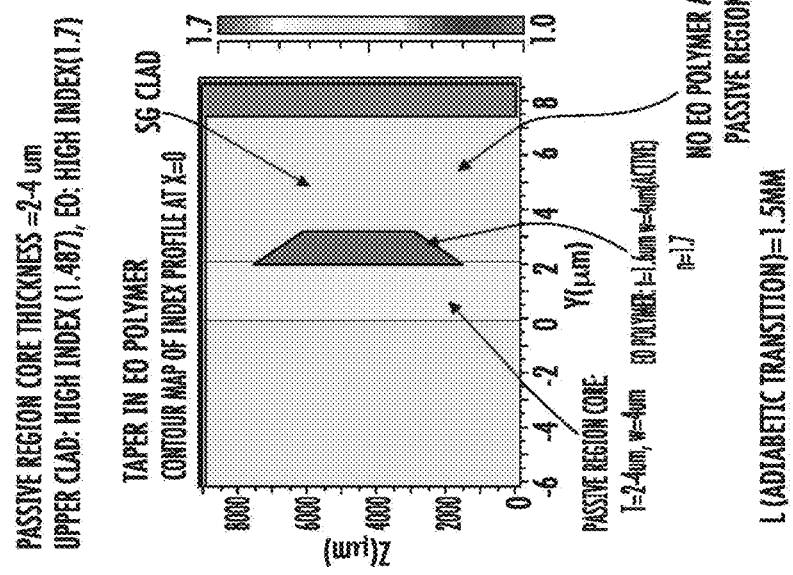
FIG. 20A
FIG. 20B
FIG. 20C
FIG. 20D

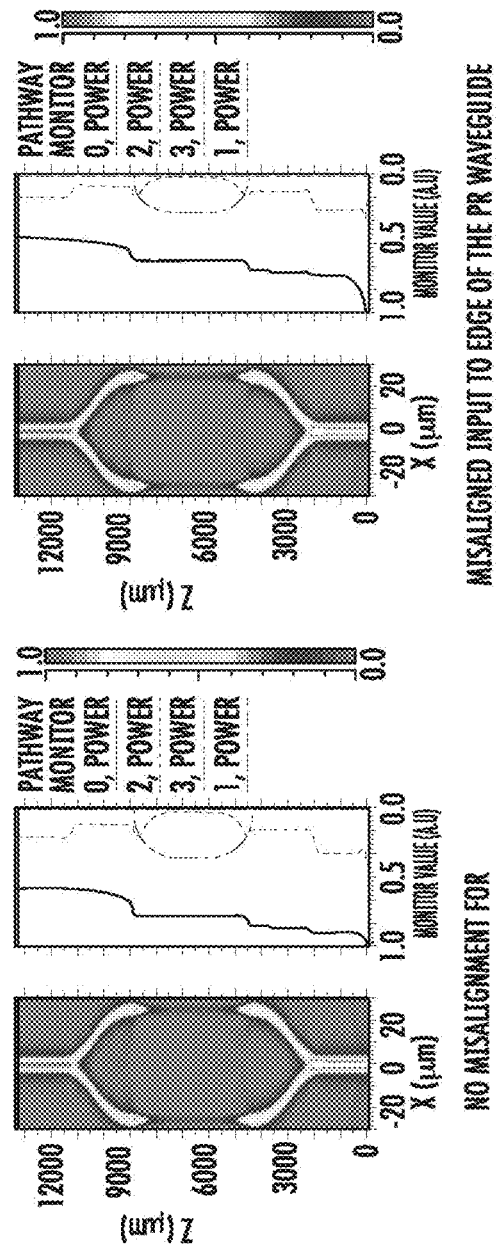

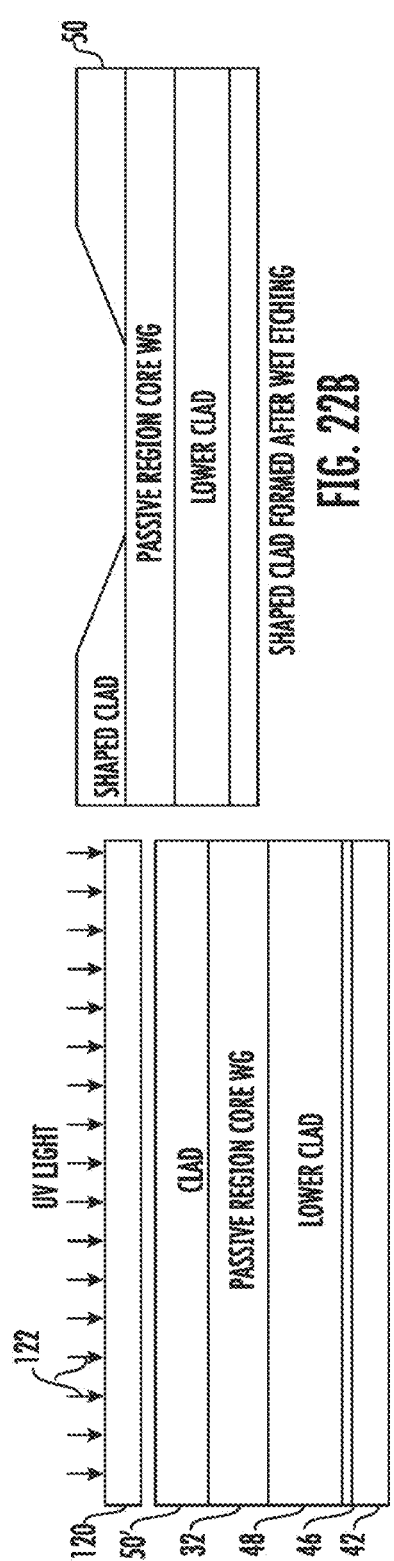
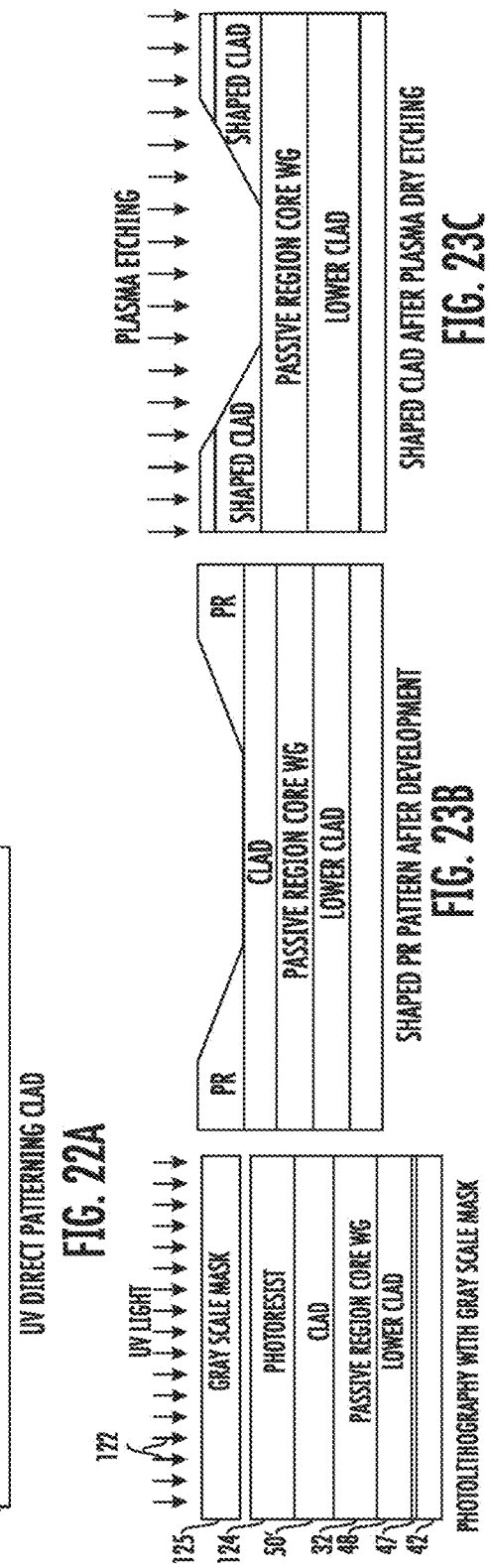

ACTIVE REGION-LESS MODULATOR AND METHOD

FIELD OF THE INVENTION

This invention relates to polymer modulators and more specifically to modulators with electro optic cores that do not reach the edges of the chip they are included within.

BACKGROUND OF THE INVENTION

A polymer ridge waveguide is typically made of a lower cladding layer, an active region and an upper cladding layer. A modulator formed from this prior art waveguide has additional top and bottom electrodes for input of the modulating electrical signals. An active region layer is a host guest system made of a host polymer and a guest chromophore, or multiple guest chromophores, or monolith (or 100%) of a chromophore, or polymers with chromophores in their main chains or side chains. In prior art modulators the active region transverses the complete modulator structure so that light being modulated enters directly into and exits directly out of the active region layer.

Because the prior art active region layer is limited in thickness and size, direct input and output coupling to optical fibers and free space light can be inefficient and require tight tolerances that increase cost and reduce efficiency.

It would be highly advantageous, therefore, to remedy the foregoing and other deficiencies inherent in the prior art.

Accordingly, it is an object of the present invention to provide a new and improved active region-less polymer modulator with more efficient optical coupling between the modulator chip and the outside world.

It is another object of the present invention to provide a new and improved active region-less polymer modulator with higher reliability, since the active material is never exposed to the outside world-atmosphere.

It is another object of the present invention to provide a new and improved active region-less polymer modulator with higher reliability, since the active material is not subject to optical reflections, rough surfaces, and other effects that could affect optical light transmission.

SUMMARY OF THE INVENTION

To achieve the desired objects and advantages of the present invention an active region-less polymer modulator is disclosed. The polymer modulator includes a first cladding layer, a passive core region with a surface abutting a surface of the first cladding layer, the passive core region extending to define an optical input and an optical output for the modulator, a shaped electro-optic polymer active component with a surface abutting a surface of a central portion of the passive core region, the shaped electro-optic polymer active component being polled to align dipoles and promote modulation of light, the shaped electro-optic polymer active component having a length that extends only within a modulation area defined by modulation electrodes, and a second cladding layer enclosing the shaped electro-optic polymer active component and designed to produce adiabatic transition of light waves traveling in the passive core region into the shaped electro-optic polymer active component to travel the length of the shaped electro-optic polymer active component and return to the passive core region.

To further achieve the desired objects and advantages of the present invention a specific embodiment of an active region-less polymer modulator is disclosed. The polymer modulator includes a substrate with a lower electrode on the substrate and a lower cladding layer on the lower electrode. A passive core region is formed on the lower cladding layer and extends to define an optical input and an optical output for the modulator. A side cladding layer is formed beside the passive core region and forms a planarized surface on the passive core region and lower cladding layer. A shaped electro-optic polymer active component is formed on a central portion of the passive core region of the planarized surface. The shaped electro-optic polymer active component is polled to align dipoles and promote modulation of light and has a length that extends only within a modulation area. An upper cladding layer encloses the shaped electro-optic polymer active component and is designed to produce adiabatic transition of light waves in the passive core region into the shaped electro-optic polymer active component to travel the length of the shaped electro-optic polymer active component and return to the passive core region. An upper electrode overlies the shaped electro-optic polymer active component so as to define with the lower electrode the modulation area.

To further achieve the desired objects and advantages of the present invention a specific method of fabricating an active region-less polymer modulator is disclosed. The method includes forming a first cladding layer and forming a passive core region with a surface abutting a surface of the first cladding layer. The passive core region extends to define an optical input and an optical output for the modulator. The method further includes forming a shaped electro-optic polymer active component with a surface abutting a surface of a central portion of the passive core region. The shaped electro-optic polymer active component is polled to align dipoles and promote modulation of light and has a length that extends only within a modulation area defined by modulation electrodes. The method further includes enclosing the shaped electro-optic polymer active component with a second cladding layer designed to produce adiabatic transition of light waves in the passive core region into the shaped electro-optic polymer active component to travel the length of the shaped electro-optic polymer active component and return to the passive core region.

BRIEF DESCRIPTION OF THE DRAWINGS

Specific objects and advantages of the invention will become readily apparent to those skilled in the art from the following detailed description of a preferred embodiment thereof, taken in conjunction with the drawings in which:

FIG. 14 (A) is a cross sectional view and 14(B) is side view of one leg of a Mach-Zehnder modulator illustrating a step of coating the active component on the structure of FIGS. 13 and 14(C) illustrates different cross-sectional shapes for the active core regions;

FIGS. 19 (A)-(D) illustrate the adiabatic transition between the passive region and the active component for various different thicknesses of the active component;

FIGS. 20 (A)-(D) illustrate the adiabatic transition between the passive region and the active component for various different thicknesses of the passive region;

FIGS. 21 (A) and (B) illustrate the adiabatic transition between the passive region and the active component for different alignments of input light;

FIGS. 22 (A), and (B) illustrate steps in a process for fabricating the shaped cladding layer using a wet etching process; and FIGS. 23 (A), (B), and (C) illustrate steps in a process for fabricating the shaped cladding layer using a dry etching process.

DETAILED DESCRIPTION OF THE DRAWINGS

Figure 1:
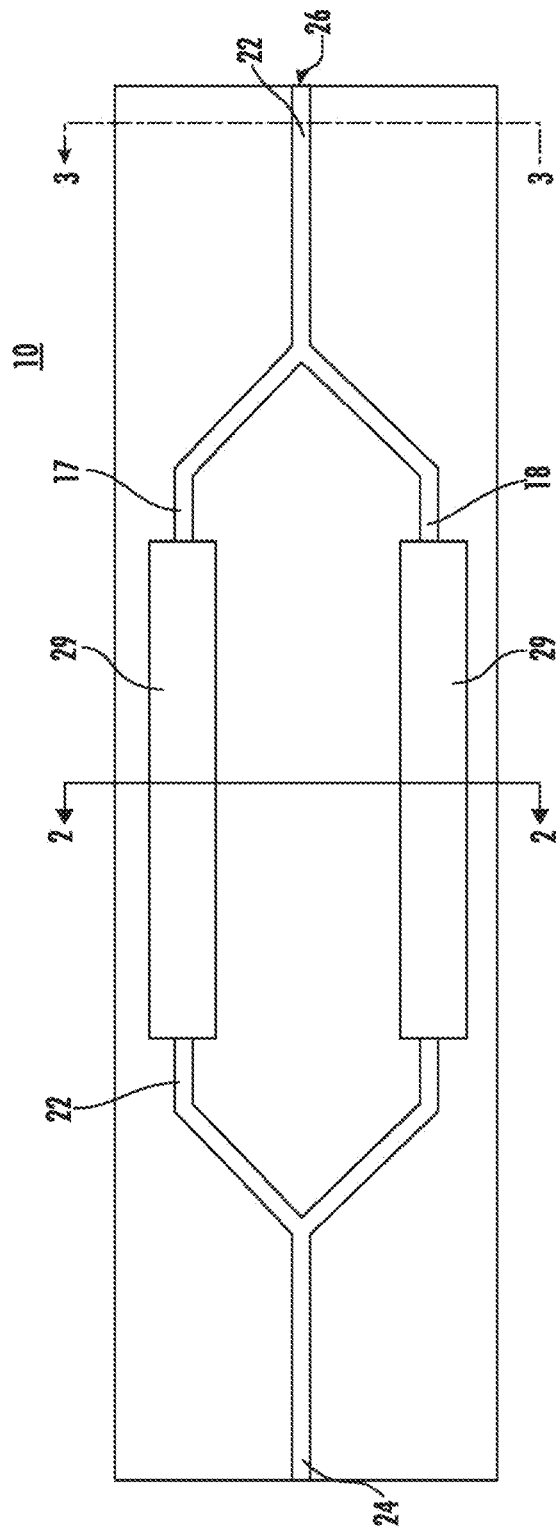
FIG. 1 is a top plan view of a prior art Mach-Zehnder modulator.
Figure 2:
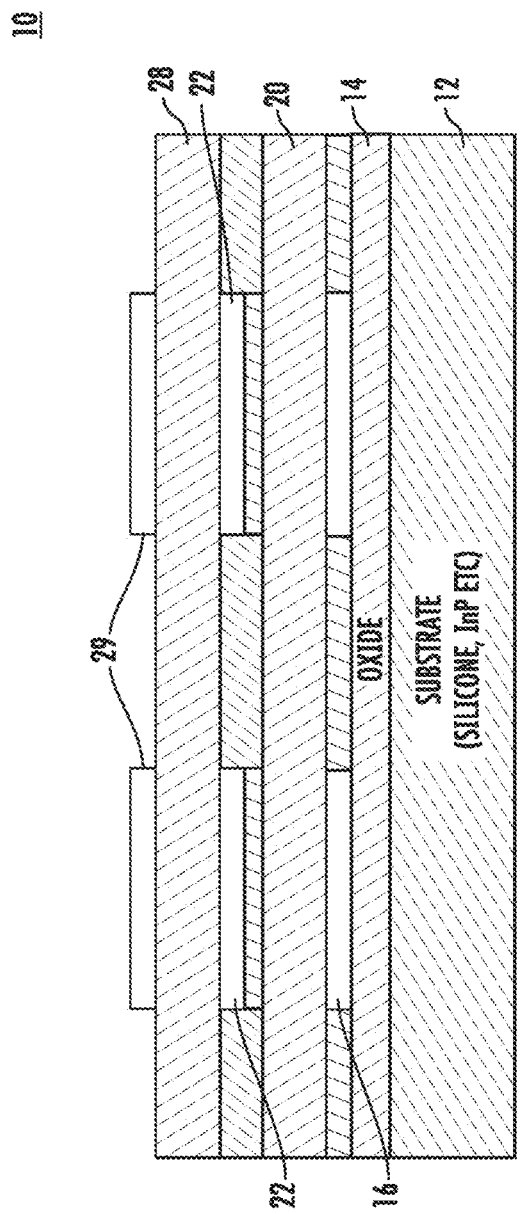
FIG. 2 is a cross sectional view of the Mach-Zehnder modulator of FIG. 1 as seen from the line 2-2.
Figure 3:
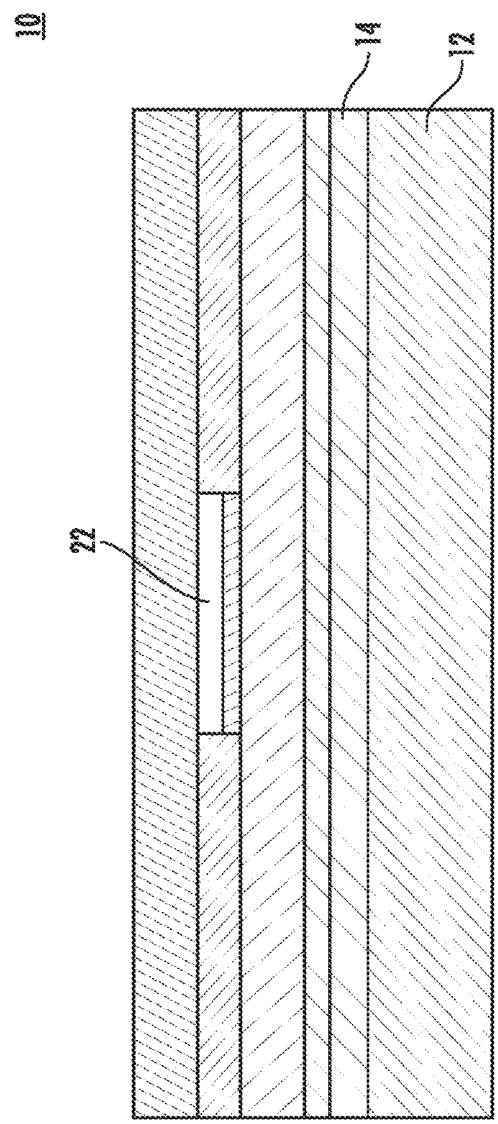
FIG. 3 is a cross sectional view of the Mach-Zehnder modulator of FIG. 1 as seen from the line 3-3.

Referring to FIGS. 1-3 a prior art Mach-Zehnder modulator 10 is illustrated. Modulator 10 is fabricated on a substrate 12 with an insulating layer 14 of an oxide, such as silicon oxide or the like. Lower electrodes 16 of some material, such as gold, are formed on layer 14 beneath portions of legs 17 and 18 of modulator 10. A lower cladding layer 20 is deposited over lower electrodes 16 and planarizes the structure. An active region 22 is deposited on lower cladding layer 20 and formed to extend from an optical input 24 to an optical output 26 with legs 17 and 18 formed therebetween. An upper cladding layer 28 is deposited over active region 22 and upper electrodes 29 are formed on upper cladding layer 28 overlying portions of legs 17 and 18 and lower electrode 16. As can be seen in FIGS. 1-3, the entire core of modulator 10 is composed of active polymer material. Thus, active region 22 transverses the complete modulator structure so that light being modulated enters directly into and exits directly out of the active region layer.

Because the prior art active region layer is limited in thickness and size, direct input and output coupling to optical fibers and free space light can be inefficient and require tight tolerances that increase cost and reduce efficiency.

Figure 4:
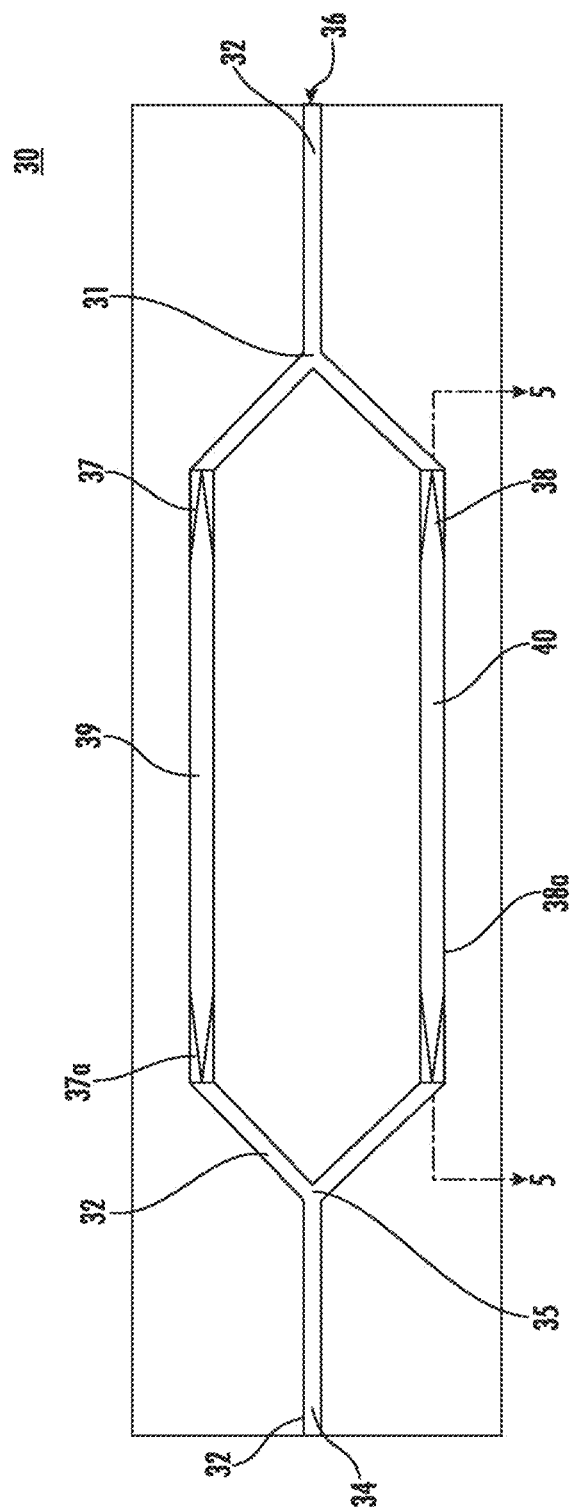
FIG. 4 is a top plan view of a Mach-Zehnder modulator in accordance with the present invention.

Turning now to FIG. 4, a Mach-Zehnder modulator 30 is illustrated in which a passive core region 32 is formed that extends from an optical input 34, through a Y-branch 35, into legs 37 and 38, into another Y-branch 31, and to an optical output 36. Legs 37 and 38 include parallel central portions 37a and 38a which include the modulation area of modulator 30. Shaped active components 39 and 40 are formed on passive core region 32 and overlying central portions 37a and 38a of legs 37 and 38. Shaped active components 39 and 40 are preferably fabricated with a host-guest system made of a host polymer and a guest chromophore. The active component is the electro-optic guest-host that is polled to align dipoles that will promote the modulation of light with electrical energy (i.e. active component). Additional poling information can be found in a copending U.S. patent application entitled "Polymer Modulator and Laser Integrated on a Common Platform and Method", Ser. No. 15/692,080, filed 31 Aug. 2017 and included herein by reference. Active components 39 and 40 are confined within the periphery of the chip and do not reach the outside edges. Passive core region 32 can be any material that defines a core for a waveguide, other than an active polymer, and in this invention is designed for more efficient optical coupling to optical fibers and free space light. Because passive core region 32 is not active and not included in the modulation process, the dimensions are less critical and passive core region 32 can be fabricated with, for example, a larger cross-section. In this example passive core region 32 is sized larger for higher more tolerance alignment with single mode optical fibers.

While in this disclosure the shaped active components are disclosed as overlying central portions of the passive core region, it should be understood that it is possible, with some additional effort, to situate the shaped active components in underlying relationship to central portions of the passive core region. Such an arrangement might not operate as well as the disclosed structure but might be preferable in some specific applications. To this end, one of an upper or lower cladding layer may be referred to as a first cladding layer and the other may be referred to as a second cladding layer. Also, while a Mach-Zehnder modulator is used in the following examples as a preferred structure for the use of the present invention, it should be understood that other circuits, modulators and the like may benefit from the novel concept.

Figure 5:
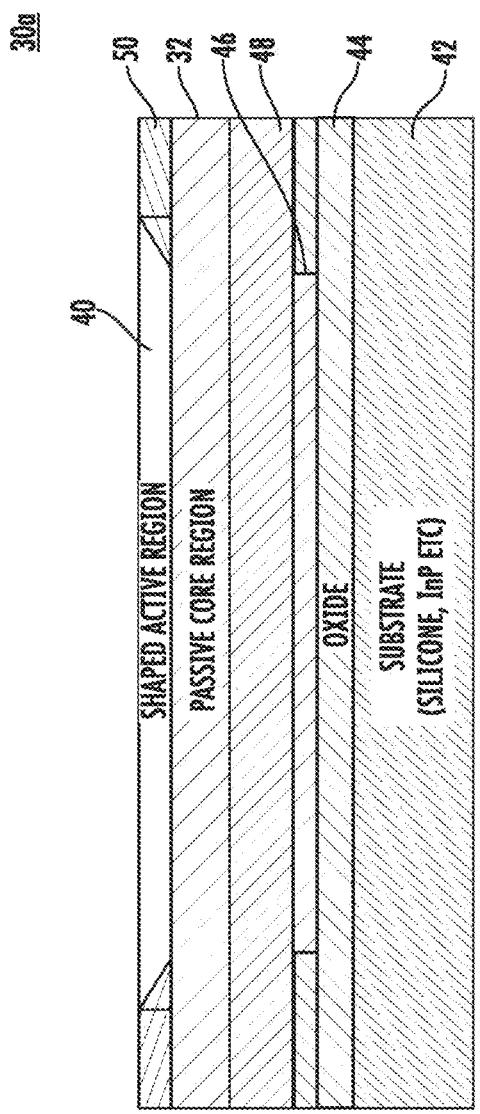
FIG. 5 is a side view as seen from the line 5-5 in FIG. 4 of one example of an active component for the Mach-Zehnder modulator of FIG. 4.
Figure 6:
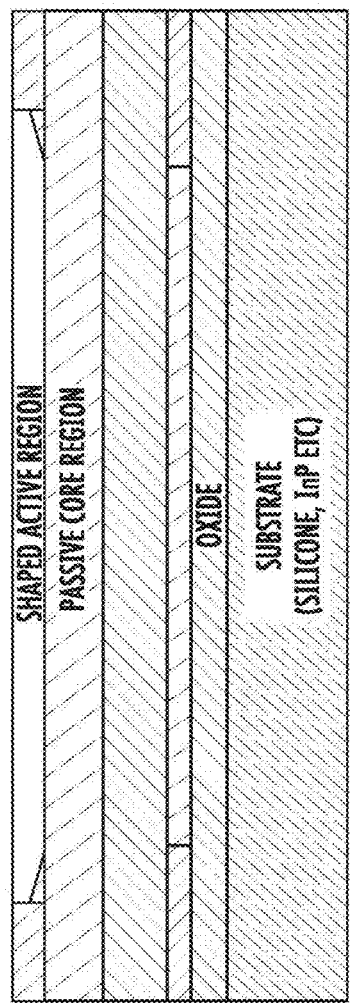
FIG. 6 is a side view as seen from the line 5-5 in FIG. 4 of another example of an active component for the Mach-Zehnder modulator of FIG. 4.
Figure 7:
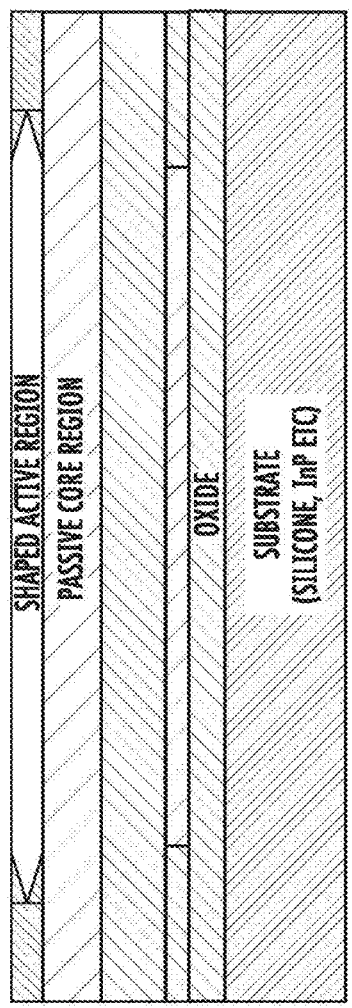
FIG. 7 is a side view as seen from the line 5-5 in FIG. 4 of another example of an active component for the Mach-Zehnder modulator of FIG. 4.

Referring additionally to FIGS. 5-7 additional details of the various layers making up Mach-Zehnder modulator 30 are illustrated along with several examples of various shapes for active components 39 and 40. In addition to the various end shapes illustrated it should be understood that the length of active components 39 and 40 can be varied. In these examples, the Mach-Zehnder modulator is designated 30a-30c to indicate the examples of different shaped active components included therein. The shape of the active components ends can be pointed or curved and the angle and shape can be varied from an optimum of 1 degree from the horizontal, with a preferred angle in a range of 0.5 degrees to 5 degrees. Note that both ends of the shaped active components in FIG. 7 have upper and lower adiabatic transitions.

Figure 8:
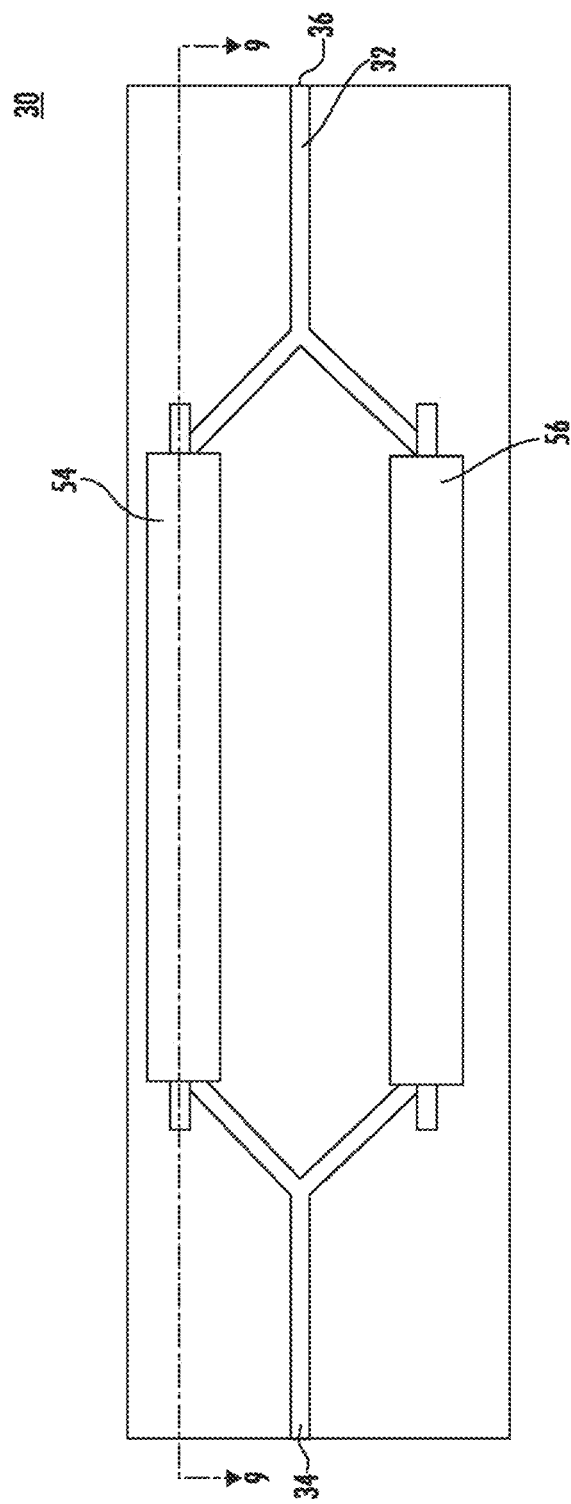
FIG. 8 is a top plan view of the Mach-Zehnder modulator of FIG. 4 with upper electrodes in accordance with the present invention.
Figure 9:
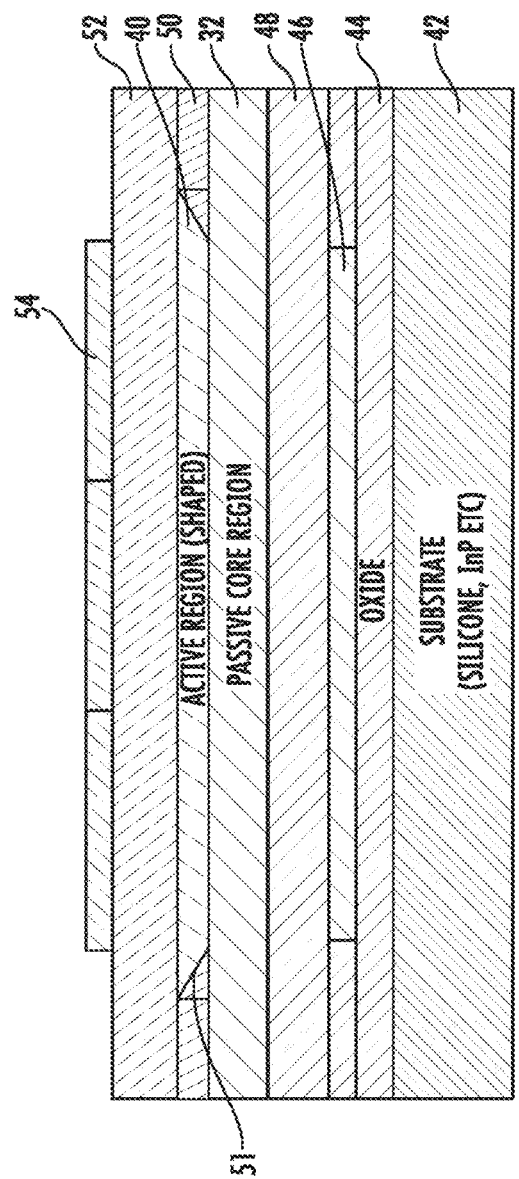
FIG. 9 is a cross sectional view of the Mach-Zehnder modulator of FIG. 8 as seen from the line 9-9.
Figure 10A:
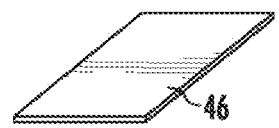
FIG. 10 (A)-(H) illustrate steps in the fabrication of the Mach-Zehnder modulator of FIG. 8.
Figure 10E:
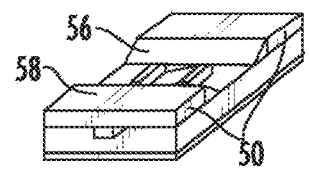
Figure 10B:
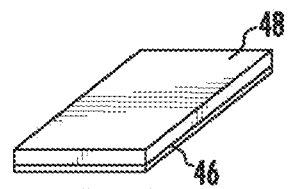
Figure 10F:
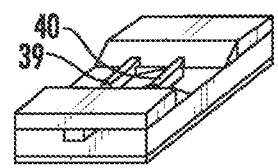
Figure 10C:
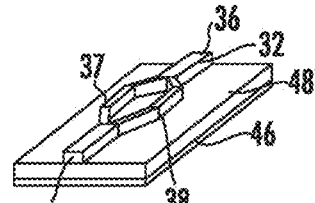
Figure 10G:
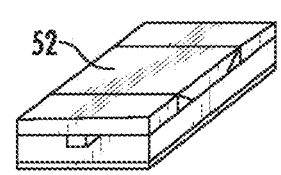
Figure 10D:
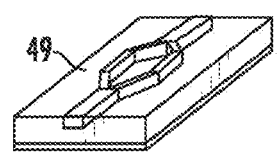
Figure 10H:
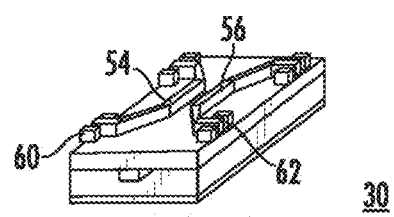

Turning to FIGS. 8 and 9, the various components of Mach-Zehnder modulator 30 are illustrated in more detail. A substrate 42 is provided of a semiconductor material such as silicon, InP, or the like which allows Mach-Zehnder modulator 30 to be integrated directly into other electronic circuitry. An insulating layer 44 of an oxide, such as silicon oxide or the like, is deposited or formed on substrate 42. Lower or ground electrode 46 of some material, such as gold, is formed on insulating layer 44 at least beneath central portions 37a and 38a of legs 39 and 40 of modulator 30. A lower cladding layer 48 is deposited over lower electrode 46 and planarizes the structure. Passive core region 32 is deposited on lower cladding layer 48 with a lower surface abutting an upper surface of lower cladding layer 48, as described above. A side cladding layer 49 (see FIG. 10 (D)) is deposited beside passive core region 32 to planarize the structure. A shaped portion 50 of an upper cladding layer 52 is deposited over passive core region 32 and side cladding layer 49 and shaped active components 39 and 40 are deposited over passive core region 32 between shaped portion 50 of upper cladding layer 52. Shaped active components 39 and 40 have lower surfaces that abut upper surfaces of passive core region 32. A remaining portion of upper cladding layer 52 is deposited to enclose shaped active components 39 and 40 and has a lower surface that abuts an upper surface of shaped active components 39 and 40. It should be understood that shaped portion 50 and shaped active components 39 and 40 can be deposited in any order commensurate with the particular shapes selected. Referring specifically to FIG. 8, upper electrodes 54 and 56 are formed on upper cladding layer 52 overlying portions of shaped active components 39 and 40 and lower electrode 46. Upper electrodes 54 and 56 are preferably formed of some easily deposited metallic material such as gold or the like. Upper cladding regions 50 and 52 are designed to allow adiabatic transition of the input optical wave up from passive region core 32 to active components 39 and 40 and back down to passive region core 32 for exiting the modulator. In this disclosure the term "adiabatic transition' is defined as meaning a transition of light from one region to another with substantially no loss or gain of energy.

In the operation of modulator 30 in FIG. 9 (for example), the main mode of single mode light enters passive core region 32 at the left and travels from left to right. The main optical mode travels until it sees a higher refractive index than the refractive index of passive core region 32. In modulator 10, as an example, the refractive index of passive core region 32 is 1.5 and the refractive index of shaped active components 39 and 40 is 1.7. In modulator 30, as the main optical mode travels to the right, it slowly sees the higher refractive index of the shaped active components 39 and 40, because of the slanted or angled portion 51 of shaped portion 50 of upper cladding layer 52, and slowly leaks into the higher refractive index material as active components 39 and 40 are brought closer to passive core region 32. The slanted portion 51 of shaped portion 50 is defined herein as an adiabatic transition and the angle determines the amount or speed with which the main optical mode leaks into active components 39 and 40. Preferably the angle of slanted portion 51 is about 0.4 degrees to 1 degree to the horizontal although the main optical mode will leak at higher angles (e.g. up to 30 degrees) but lots of light will be lost. To maintain a good leakage to higher order material, a slow adiabatic transition is preferred from the passive region to the active component and then back down to the passive region.

Turning now to FIG. 10 steps (A) through (H) in the fabrication of Mach-Zehnder modulator 30 are generally illustrated. In step (A), lower electrode 46 is deposited on insulating layer 44 on substrate 42. Lower cladding layer 48 is deposited on lower electrode 46 in step (B). In step (C), passive core region 32 is formed on lower cladding layer 48 in the shape of a Mach-Zehnder modulator with an optical input 34, an optical output 36 and legs 37 and 38. Side lower cladding layer 49 is deposited in step (D) to planarize the structure. Shaped portion(s) 50 of upper cladding layer 52 are formed on portions of passive core region 32 and side lower cladding layer 49. Shaped portion(s) 50 preferably include evanescent optical coupling planes 56 and 58. In step (F), shaped active components 39 and 40 are formed on the exposed portions of passive core region 32 (central portions of legs 37 and 38) between evanescent optical coupling planes 56 and 58 of shaped portion(s) 50. Here it should be understood that light is coupled from passive core region 32 up into active components 39 and 40 and back down into passive core region 32 by the evanescent optical coupling. Upper cladding layer 52 is completed in step (G) to enclose active components 39 and 40 and planarize the structure. Upper electrodes 60 and 62 are formed on upper cladding layer 52 with central portions 54 and 56 overlying active components 39 and 40, respectively.

Figure 11:
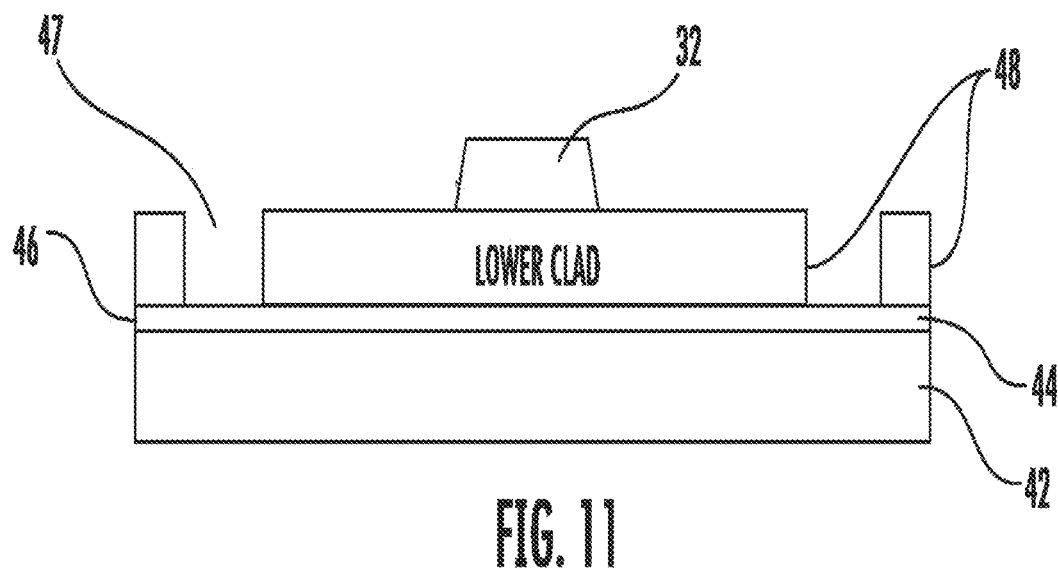
FIG. 11 is a cross sectional view of one leg of a Mach-Zehnder modulator illustrating steps in the fabrication of the passive core for the Mach-Zehnder modulator of FIG. 8.

Turning to FIG. 11, several steps in the fabrication process are illustrated in more specific structure. The fabrication of Mach-Zehnder modulator 30 is again used as an example but it should be understood that other steps could be introduced or other modulators could be fabricated. Substrate 42, such as Si, InP, or the like, is provided and coated with layer 44 of dielectric or insulating material. Ground electrode 46 is deposited on layer 44. An example of materials that can be used includes providing a silicon substrate, forming a silicon oxide layer on the substrate and depositing a conductive layer of gold or multiple layers including Ti/Au/Ti. Lower cladding layer 48 is deposited on ground electrode 46 in the preferred embodiment by spin coating sol-gel and UV or thermal baking to provide a layer with a thickness in a range of 2-8 µm, preferably 3-5 µm, and with a refractive index in a range of 1.0 to 1.8, and preferably in a range of 1.4 to 1.6. Ground openings 47 are formed, in this preferred embodiment, by UV exposure and IPA etching. Passive region core 32 is formed by spin coating sol-gel and UV or thermal baking to provide a layer with a thickness in a range of 2-4 µm and with a refractive index in a range of 1.0 to 1.8 and preferably in a range of 1.4 to 1.6. Passive region core 32 is formed using either wet or dry etch, thinner layers (<5 µm) are better dry etched.

Figure 12:
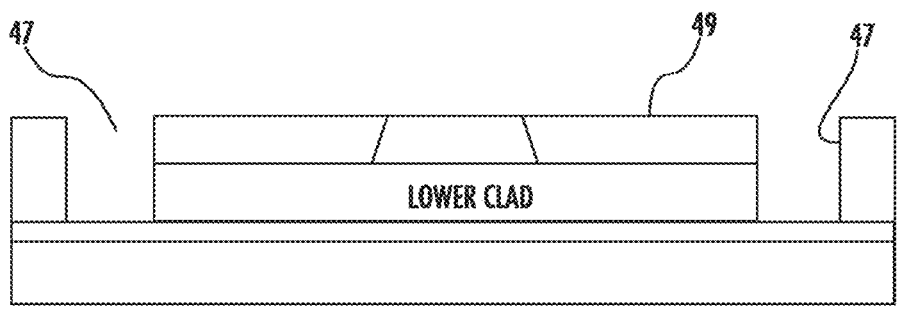
FIG. 12 is a cross sectional view of one leg of a Mach-Zehnder modulator illustrating steps in the fabrication of the side cladding for the Mach-Zehnder modulator of FIG. 8.
Figure 13B:
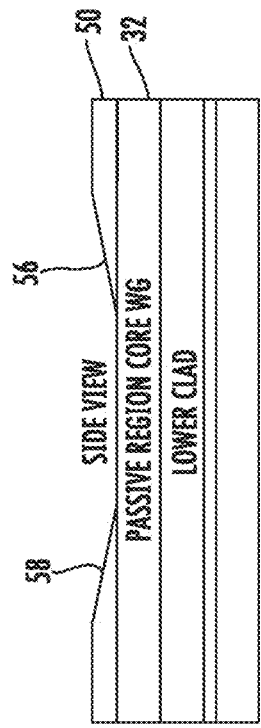
FIG. 13 (A) is a cross sectional view and 13(B) is side view of one leg of a Mach-Zehnder modulator illustrating steps in the fabrication of the upper shaped cladding layer for the Mach-Zehnder modulator of FIG. 8.
Figure 13A:
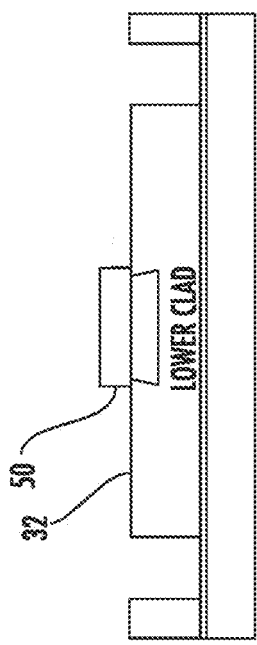

Referring additionally to FIG. 12, side cladding 49 is deposited over the structure of FIG. 11 and patterned to retain ground openings 47. Side cladding 49 is formed of material and in a process similar to the formation of lower cladding layer 48. Referring additionally to FIG. 13, shaped portions 50 of upper cladding layer 52 are formed on portions of passive core region 32 and side lower cladding layer 49. Shaped portions 50 preferably include evanescent optical coupling planes 56 and 58. Upper cladding layer 50 is deposited in the preferred embodiment by spin coating sol-gel and UV or thermal baking to provide a layer with a thickness in a range of 3-4 µm, and with a refractive index in a range of 1.0 to 1.8, and preferably in a range of 1.4 to 1.6 (in this specific embodiment 1.487). Referring additionally to FIG. 14, active components 39 and 40 of electro-optic polymer are patterned and etched (preferably by photolithography) onto the portions of passive core region 32 between and including evanescent optical coupling planes 56 and 58. In this preferred embodiment active components 39 and 40 have a rectangular cross-section but it should be understood that they can have other cross-sections, such as those illustrated in FIG. 14(C), especially for narrow stripes. Active components 39 and 40 with a refractive index in a range of 1.5 to 2.0, and preferably in a range of 1.65 to 1.75 (in this specific embodiment 1.70).

Figure 15B:
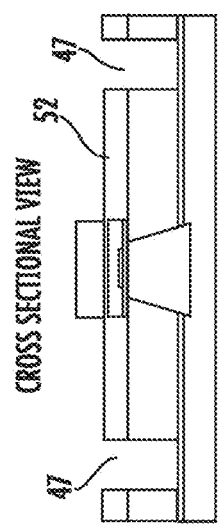
FIG. 15 (A) is a cross sectional view and 15(B) is side view of one leg of a Mach-Zehnder modulator illustrating steps in the fabrication of the upper cladding layer for the Mach-Zehnder modulator of FIG. 8.
Figure 15A:
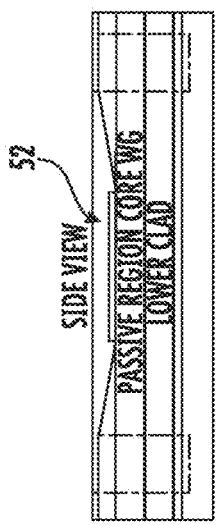
Figure 16A:
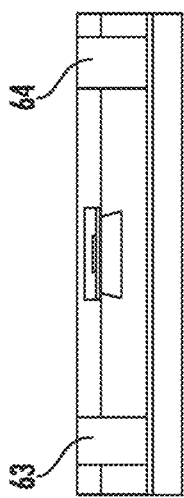
FIG. 16 (A) is a cross sectional view and 16(B) is side view of one leg of a Mach-Zehnder modulator illustrating steps in the fabrication of the electrodes for the Mach-Zehnder modulator of FIG. 8.
Figure 16B:

Turning to FIG. 15, upper cladding layer 52 is deposited and patterned to enclose active components 39 and 40 and planarize the structure while retaining ground openings 47. Upper cladding layer 52 is formed of material and in a process similar to the formation of upper cladding layer 50. Referring additionally to FIG. 16, ground openings are filled, preferably by electroplating, with electrical conductors 63 and 64, including conductive material such as gold, to provide electrical communication from ground electrode 46 to the surface of the structure. Upper electrodes 60 and 62 are formed on upper cladding layer 52 with central portions 54 and 56 overlying active components 39 and 40, respectively, and the ends in electrical communication with electrical conductors 63 and 64.

Generally, the adiabatic transition is accomplished using an angle of about 1 degree with the horizontal in the cladding layer. However, the angle can range from about 0.4 degrees to 1 degree. Also, optical mode confinement is dependent on the angle of the adiabatic transition region, thickness of the active component(s) and the passive region layers, and material characteristics such as refractive, and lateral dimensions. Various shapes and lengths of the adiabatic transition region can be designed in both width and height.

Some fabrication details as to the above described structure are as follows. Organosilicate sol-gel solution is used for the cladding and passive region waveguide layers, which in the preferred embodiment consist of methacryoloyloxy propyltrimethoxysilane. The refractive index of the layers can be varied by using zirconium IV-n-propoxide and molar ratios of 95-5% with a range of 60-40% to 99-1%. Sol-gels can be patterned using UV radiation via photomasks. Exposed portions of sol-gels are insoluble in isopropanol which is used as an etchant for the wet-etching process. Dry etching can also be utilized using SF6. Sol-gels can be cured via UV radiation as well as thermal baking.

Figure 17A:
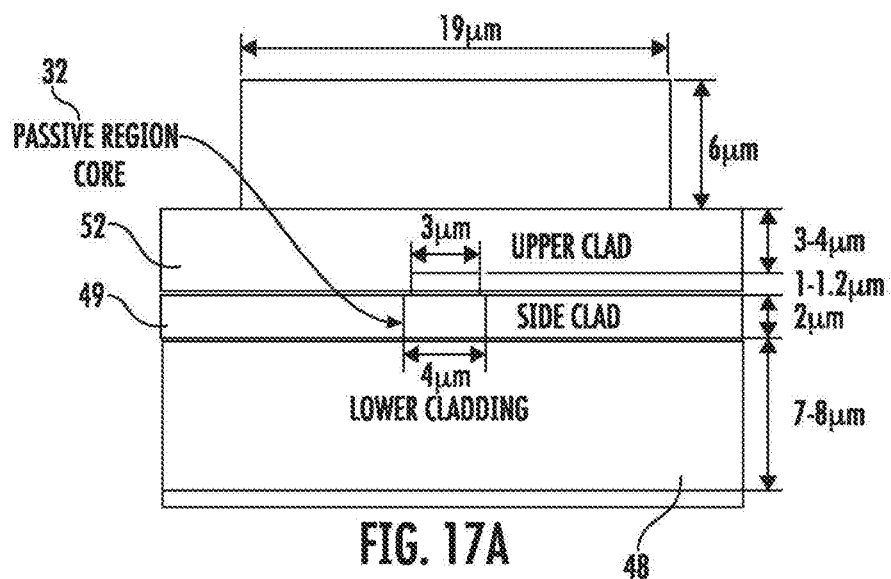
FIG. 17 (A) is a cross sectional view and 17(B) is side view of one leg of a Mach-Zehnder modulator illustrating dimensions of the various components of the Mach-Zehnder modulator of FIG. 8.
Figure 17B:
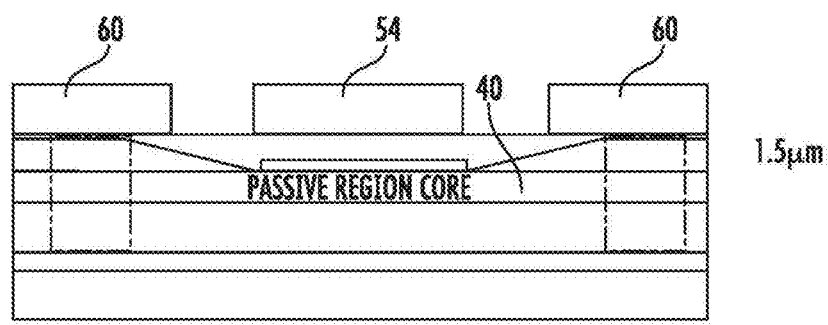

Referring to FIG. 17(A), some typical measurements for the Mach-Zehnder modulator 30 are illustrated. Examples of ranges for the various components include: 7-8 μm thick for lower cladding layer 48; 2 μm thick and 4 μm width for passive core region 32; 2 μm thick for side cladding layer 49; 1-1.2 μm thick and 3 μm width for active components 39 and 40; and 3-4 μm for upper cladding layer 52. Also, some refractive indexes of the various layers in a preferred embodiment are as follows. Lower cladding layer 48 is formed of sol-gel such as Si/Zr with a molar ratio of 85/15 and has a refractive index of 1.487, with a range of 1.0 to 1.8, preferably 1.4 to 1.6. Passive region core 32 has an R1>than that of lower cladding layer 48 (R=refractive index) and a refractive index of 1.500, with a range of 1.0 to 1.8, preferably 1.4 to 1.6. Side cladding layer 49 has a refractive index of 1.487, with a range of 1.0 to 1.8, preferably 1.4 to 1.6. Upper cladding layer 52 has a refractive index of 1.487, with a range of 1.0 to 1.8, preferably 1.4 to 1.6.

Figure 18A:
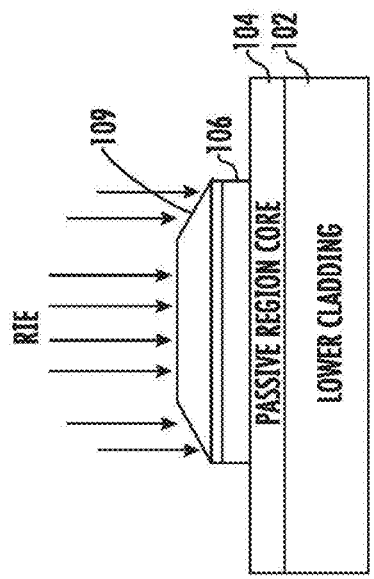
FIGS. 18 (A), (B), and (C) illustrate steps in one process for fabricating the active layer in a Mach-Zehnder modulator.
Figure 18B:
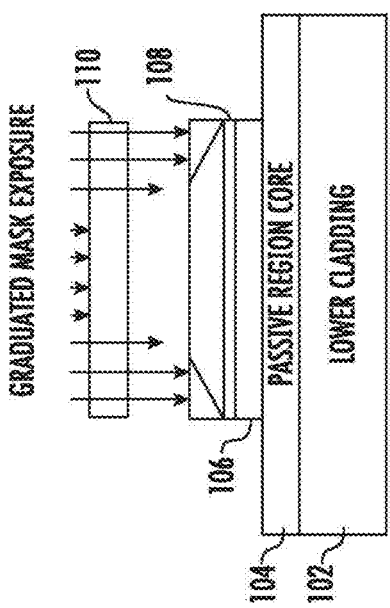
Figure 18C:
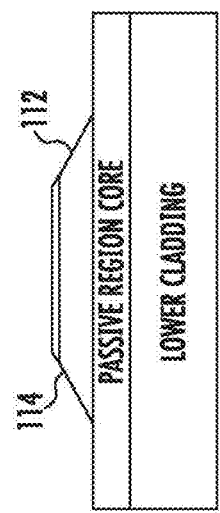

Turning now to FIGS. 18 (a), (b), and (c), a method of fabricating shaped active components 39 and 40 is illustrated. Referring specifically to FIG. 18 (a), a lower cladding layer 102 is formed with a passive region core 104 thereon, preferably as described above. A layer 106 of EO polymer is patterned on the surface of passive region core 104 in a selected location or locations. A protective layer 108 is deposited on the surface of layer 106 and a layer of photo resist is deposited on protective layer 108. Protective layer 108 is exposed through a graduated mask 110 and the exposed portions removed in a well-known process to leave a photo resist etch mask as illustrated in FIG. 18 (b). Using an RIE etching technique (dry etching), the structure of FIG. 18 (b) is etched to form edges of EO polymer layer 106 into adiabatic transition surfaces 112 and 114. One advantage of this process is that the length of adiabatic transition surfaces 112 and 114 can be easily controlled to longer lengths (e.g. >1.5 mm). Also, the shape of adiabatic transition surfaces 112 and 114 can be changed for performance optimization, for example, the shape can be super linear, curved (concave or convex) in addition to a straight angled line.

Referring to FIG. 19, the effects on adiabatic transition of light between the passive region core and the active component core as the EO polymer thickness is varied from 1.6 μm to 0.4 μm (FIGS. (B)-(E)), respectively, is illustrated. In all four examples the passive region core has a 2 μm thickness and a 4 μm width. It can be seen that the thicker passive region cores result in lower transition loss and higher mode confinement. Referring additionally to FIG. 20, the effects on adiabatic transition of light between the passive region core and the active component core as the passive region core thickness is varied from 2 μm to 4 μm (B)-(D), respectively, is illustrated. In all three examples the EO polymer has a 1.6 μm thickness and a 4 μm width. It can be seen that the thicker passive region cores result in lower transition loss, higher mode confinement and stable transition.

An additional test performed on a Mach-Zehnder modulator and illustrated in FIGS. 21 (A) and (B) is believe to be of interest. In these examples, light is introduced into a Mach-Zehnder modulator (e.g. modulator 30 of FIG. 4) with no misalignment in FIG. (A) and with misalignment in FIG. (B). In both examples the EO polymer thickness is 1.2 μm, the passive core region thickness is 2 μm, and the index of refraction between the passive core region and the EO polymer is 0.013. The graphs in both figures show that in either example there is lower transition loss, higher mode confinement, stable transition between the passive core region and the EO polymer, and stable separation of light in the Y branches of the modulator.

Turning to FIG. 22 (A) and using modulator 30 of FIG. 9 as a basis, several steps in a wet etching process for fabricating shaped cladding layer 50 are illustrated. A layer 50' of cladding material is deposited on the upper surface of passive region core 32 using any of the materials and methods described above. Layer 50' is patterned directly through a gray scale mask 120 by UV radiation, represented by arrows 122. In this example, mask 120 changes gradually from nearly transparent at the outer edges to nearly opaque at the center to produce the desired shape for the cladding layer. Shaped cladding layer 50 is formed by wet etching the structure. Referring additionally to FIGS. 23 (A), (B), and (C) several steps in a dry etching process for fabricating shaped cladding layer 50 are illustrated. In this process, a photoresist layer 124 is deposited over cladding layer 50'. A gray scale mask 125 is used with UV light 122 to expose photoresist layer 124. In this example, mask 125 changes gradually from nearly opaque at the outer edges to nearly transparent at the center to produce the desired shape for the cladding layer. The exposed layer is developed to produce a dry etch mask 124' having the desired shape of the shaped cladding layer. Plasma etching, represented by arrows 126 is then used to etch dry etch mask 124' and cladding layer 50' to produce shaped cladding layer 50 with the desired shape. It will be understood that the wet etching process of FIG. 22 is simpler than the dry etching process of FIG. 23 but the dry etching process can provide smaller angles of shaped cladding layer 50.

Thus, a new and improved active region-less polymer modulator is disclosed in which the active components do not reach the edge of the chip but are confined within the periphery of the chip. The use of a passive core with EO polymer active components adiabatically coupled thereto results in more efficient optical coupling between the modulator chip and the outside world, and with higher reliability, since the active material is never exposed to the outside world-atmosphere and with higher reliability, since the active material is not subject to optical reflections, rough surfaces, and other effects that could affect optical light transmission. Also, waveguiding in a Mach-Zehnder modulator results in equal separation between the two branches.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. A method of fabricating a polymer modulator comprising the steps of:
    forming a first cladding layer;
    forming a passive core region overlying and with a surface abutting a surface of the first cladding layer, the passive core region extending to define an optical input and an optical output for the modulator;
    forming a shaped electro-optic polymer active component overlying and with a surface abutting a surface of a central portion of the passive core region, the shaped electro-optic polymer active component being polled to align dipoles and promote modulation of light, the shaped electro-optic polymer active component having a length that extends only within a modulation area defined by modulation electrodes; and
    enclosing the shaped electro-optic polymer active component with a second cladding layer designed to produce adiabatic transition of light waves in the passive core region into the shaped electro-optic polymer active component to travel the length of the shaped electro-optic polymer active component and return to the passive core region.

2. The method as claimed in claim 1 wherein the steps of forming the first cladding layer, the passive core region, and the second cladding layer include spin coating organosilicate sol-gels and curing the sol-gels with one of UV radiation and thermal baking.

3. The method as claimed in claim 2 wherein the steps of forming the first cladding layer, the passive core region, and the second cladding layer include adjusting refractive indexes of the first cladding layer, the passive core region, and the second cladding layer into a range of 1.0 to 1.8.

4. The method as claimed in claim 3 wherein the steps of adjusting refractive indexes of the first cladding layer, the passive core region, and the second cladding layer into a range of 1.0 to 1.8 include using zirconium IV-n-propoxide in the sol-gel in a molar ratio of 60%-40% to 99%-1%.

5. The method as claimed in claim 1 wherein the step of forming the shaped electro-optic polymer active component includes forming a shaped cladding layer overlying the passive core region and depositing the electro-optic polymer active component on the shaped cladding layer resulting in a shaped electro-optic polymer active component.

6. The method as claimed in claim 5 wherein the step of forming the shaped cladding layer includes one of wet and dry etching.

7. The method as claimed in claim 6 wherein the step of forming the shaped cladding layer using wet etching includes exposing a layer of cladding material to UV radiation through a gray scale mask and wet etching the layer of cladding material to produce the shaped cladding layer.

8. The method as claimed in claim 6 wherein the step of forming the shaped cladding layer using dry etching includes depositing a layer of photoresist over a layer of cladding material, exposing a layer of photo resist to UV radiation through a gray scale mask and plasma etching the layer of photo resist and the layer cladding material to produce the shaped cladding layer.

\* \* \* \* \*